(No Model.)

E. MATZENAUER.
FISH BITE ALARM.

No. 461,586. Patented Oct. 20, 1891.

Witnesses:
Wm. M. Rheem.
E. C. Wiedeman

Inventor
Edward Matzenauer
By Letzer Kennedy
Atty's.

UNITED STATES PATENT OFFICE.

EDWARD MATZENAUER, OF CHICAGO, ILLINOIS.

FISH-BITE ALARM.

SPECIFICATION forming part of Letters Patent No. 461,586, dated October 20, 1891.

Application filed March 9, 1891. Serial No. 384,393. (No model.)

*To all whom it may concern:*

Be it known that I, EDWARD MATZENAUER, a citizen of the United States of America, residing at Chicago, in the county of Cook and State of Illinois, have invented certain new and useful Improvements in Fish-Bite Alarms, of which the following is a specification, reference being had therein to the accompanying drawings.

This invention relates to a device to which a fishing-line is attached, and which serves to give or sound an alarm when a fish bites or takes the hook or bait attached to said line.

The object of my invention is to provide a device of this character that will be inexpensive and durable in construction, as well as simple in operation.

The invention consists in the features of construction, hereinafter fully described and specifically claimed.

Figure 1:
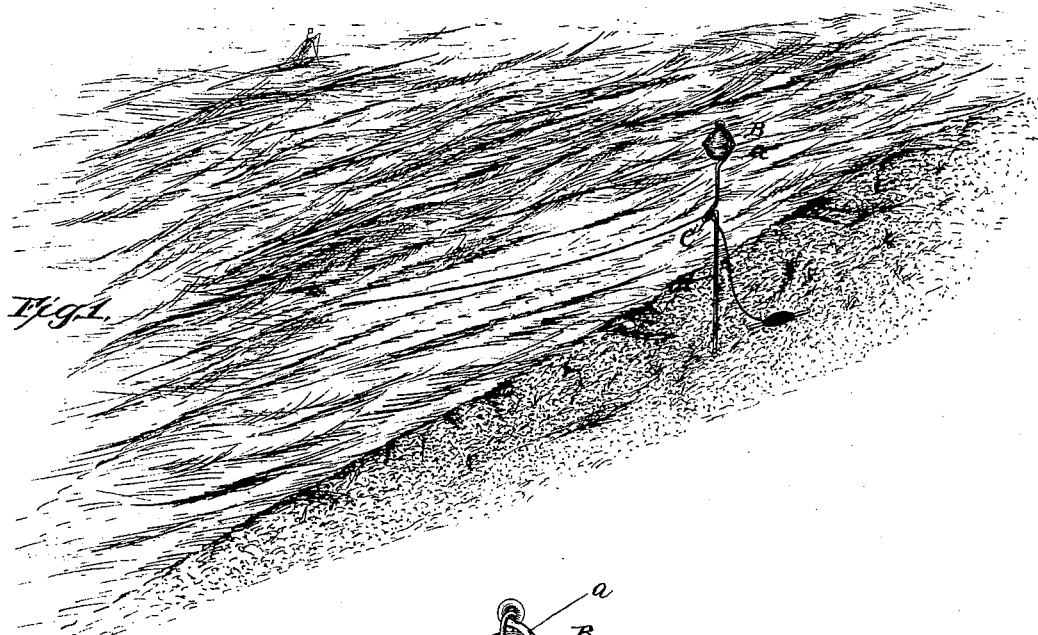
Figure 2:
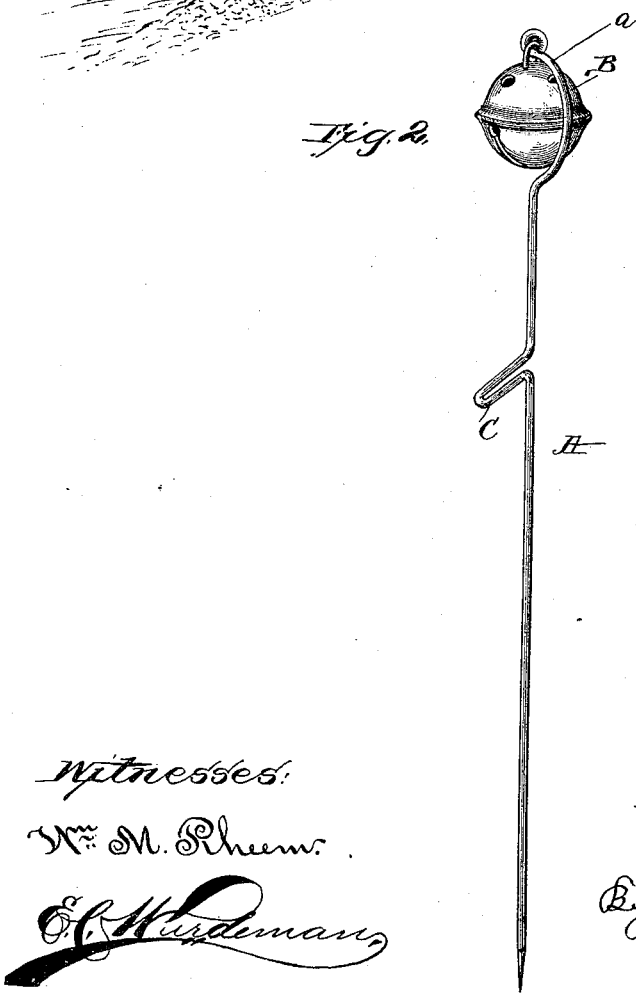

In the accompanying drawings, Figure 1 represents the bank of a stream with a fishing-line cast in the stream and secured to a device embodying my invention on the bank, and Fig. 2 is a view of my invention.

Referring to said drawings, which illustrate a convenient and simple embodiment of my invention, A indicates a standard, having a sharpened lower end 1 for insertion into the ground. To the upper end of said standard a bell B is secured, and below said bell the said standard is bent to provide a wedge-shaped notch C, by means of which the fishing-line is secured to said standard. The said standard A is made of any suitable material possessing a certain amount of resiliency and yet having enough strength to hold the fishing-line without flexure or undue flexure. A material suitable for this purpose I find to be steel wire. It is obvious that when the fishing-line attached to the standard A is jerked or pulled by reason of a fish taking the bait attached thereto, the said standard will be vibrated by reason thereof and will shake the bell B in such a manner as to sound an alarm that the person fishing may know that a fish has taken the bait.

In the drawings I have shown a simple manner of embodying my invention and have shown an ordinary sleigh-bell as the device to sound the alarm, in which case I find it convenient to bend the upper end of the standard to provide an overhanging end portion a, to which said bell is rigidly attached. This makes a very simple and inexpensive device that can be carried around in a person's pocket.

It will be understood, of course, that other forms of bells or devices for giving an alarm could be used, and that the wedge-shaped notch C, made by bending the standard, forms the most convenient construction for this purpose, and that various other devices could be used for this purpose without departing from the spirit of my invention.

I claim as my invention—

1. A fishing-tackle consisting of a flexible standard provided with a wedge-shaped notch located between its ends for attaching a fishing-line thereto, one end of said standard being adapted for insertion into the ground and the other end being provided with an alarm-bell.

2. A fishing-tackle consisting of a flexible standard bent upon itself to form a notch C for attaching a fishing-line thereto, one end of said standard being adapted for insertion into the ground and the other end being provided with an alarm-bell.

In testimony whereof I affix my signature in presence of two witnesses.

EDWARD MATZENAUER.

Witnesses:
WILLIAM H. LOTZ,
HARRY COBB KENNEDY.